United States Patent [19]

Taguchi et al.

[11] Patent Number: 4,946,700

[45] Date of Patent: Aug. 7, 1990

[54] METHOD OF PRODUCING LINEAR CURDLAN GELS

[75] Inventors: Tetsuya Taguchi, Hyogo; Yukihiro Nakao, Osaka; Hiroshi Kasai, Hyogo, all of Japan

[73] Assignee: Takeda Chemical Industries, Ltd., Osaka, Japan

[21] Appl. No.: 410,500

[22] Filed: Sep. 21, 1989

[30] Foreign Application Priority Data

Sep. 22, 1988 [JP] Japan ............................. 63-238119
Oct. 27, 1988 [JP] Japan ............................. 63-271838
Aug. 4, 1989 [JP] Japan ............................. 1-203636

[51] Int. Cl.$^5$ .............................................. A23L 1/00
[52] U.S. Cl. ..................................... 426/520; 426/573
[58] Field of Search ........................ 426/520, 573; 252/315.3

[56] References Cited

U.S. PATENT DOCUMENTS 3,754,925  8/1973  Kimura et al. ...................... 426/573

FOREIGN PATENT DOCUMENTS 7504246  10/1975  Netherlands ...................... 426/573

OTHER PUBLICATIONS

Japanese Patent Examined Publication 29571/1979 as Abstract in (Central Patent Index 765158/42).
Japanese Patent Examined Publication 34277/1973 as Abstract in (Central Patent Index 65346U-DF).
Japanese Patent Examined Publication 16618/1973 as Abstract in (Central Patent Index 30293U-D).

*Primary Examiner*—George Yeung
*Attorney, Agent, or Firm*—Wegner & Bretschneider

[57] ABSTRACT

Linear curdlan gels can be produced continuously by heating an aqueous suspension of curdlan at a temperature not lower than 85° C. during and/or after passage through a small-diameter tubing with a sectional area of 0.1 to 30 mm$^2$ at a discharge rate not exceeding 500 cm/sec. The thus obtained gels can be utilized as various food materials.

7 Claims, 2 Drawing Sheets

METHOD OF PRODUCING LINEAR CURDLAN GELS

FIELD OF THE INVENTION

The present invention relates to a method for continuous production of gels in linear forms simulating conjak (devil's tongue) noodles, gelidium jelly noodles or "mozuku" (a seaweed of the family Spermatochnaceae highly ramified into thready filaments, a delicacy served seasoned with vinegar) from curdlan which is a heat-gelable polysaccharide.

BACKGROUND OF THE INVENTION

The hithereto-known techniques for production of thready or filamentous products from curdlan include the process in which an alkaline solution of curdlan is extruded from a spinneret nozzle into an acid bath to obtain thread-like gels (Japanese Patent Publication No. 16618/1973), the process in which a certain mixture of protein and curdlan preadjusted to pH 9 to 13.5 is extruded through a nozzle into an acid coagulation bath to give a qualitatively improved edible protein fiber in filamentous form (Japanese Patent Publication No. 34227/1973) and a process for continuous production of curdlan fiber which comprises extruding a solution of curdlan in water containing sodium hydroxide or potassium hydroxide continuously into a sulfuric acid or hydrochloric acid bath supplemented with alcohol or acetone and taking up the filamentous gels under tension (Japanese Patent Publication No. 29527/1987).

OBJECTS OF THE INVENTION

The technology of producing comparatively large gels, such as slabs of conjak, table jellies, etc., by taking advantage of the thermal gelation property of curdlan is well known (Japanese Patent Publication No. 15620/1973). The technology of producing thread-like or filamentous gels is also known as mentioned above.

On the other hand, a method of producing curdlan gels in a thready or filamentous form is also known, as mentioned hereinabove. However, since these prior art methods are invariably predicated on the basic technical concept of dissolving curdlan with the aid of an alkali and, then, causing it to gel with an acid, it is difficult to incorporate subsidiary food components or condiments in the course of production so that the resulting gels cannot easily be adapted to food uses. By way of illustration, in order that the thread-like product produced by the prior art technology may be seasoned, it is necessary to wash the acid-coagulated curdlan well and, then, immerse it in a seasoning liquor. Furthermore, since such an acid-coagulated product is heated, its dimensional integrity is lost so that the product can hardly be cooked and, hence, be used only in very limited applications.

The main object of the present invention is to provide an industrially advantageous method of producing linear curdlan gels.

This object as well as other objects and advantages of the present invention will become apparent to those skilled in the art from the following description with reference to the accompanying drawings.

SUMMARY OF THE INVENTION

Figure 1:
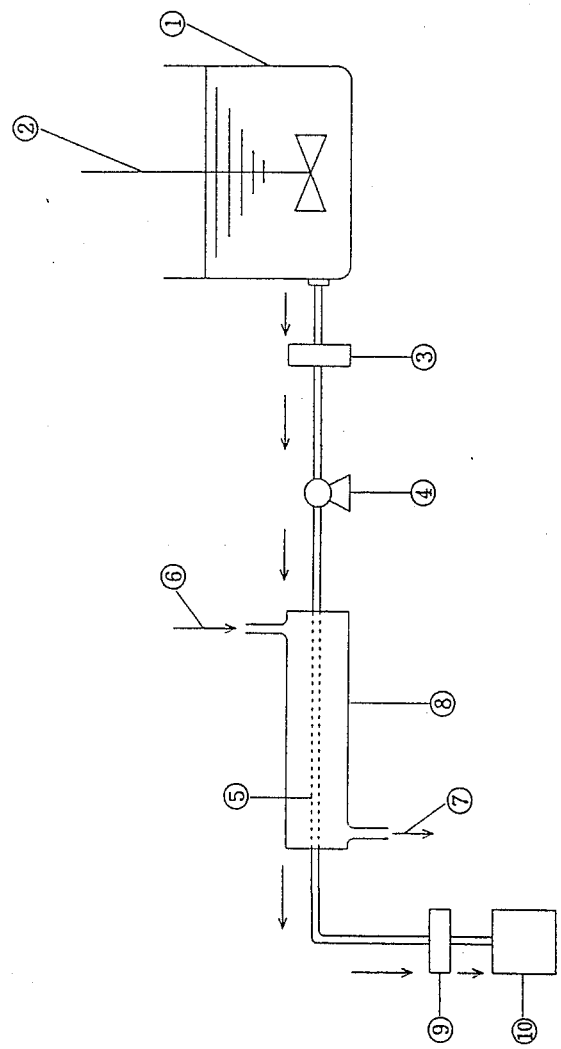
FIG. 1 shows an example of the gelation process employed in practicing the production method of the present invention. In the view, 1 represents a storage tank for an aqueous suspension of curdlan, 2 a stirrer, 3 a homogenizer, 4 a constant-rate pump, 5 a gelation tube, 6 a steam inlet, 7 a steam outlet, 8 a jacket, 9 a gels cutter, and 10 a pakcaging machine.

By the production method of the present invention, elongated curdlan gels can be continuously produced and, as the gels can be seasoned as desired in the course of production, gels simulating conjak noodles, "mozuku" or gelidium jellies can be obtained with advantage and at low cost.

DETAILED DESCRIPTION OF THE INVENTION

The inventors of the present invention did assiduous and diligent studies to overcome the problems involved in the continuous production of comparatively small-diameter elongated curdlan gel foods simulating conjak noodles, gelidium jelly noodles, "mozuku", etc. and have ultimately accomplished the present invention.

Thus, the present invention is directed to a method of producing linear curdlan gels, which comprises heating to gel an aqueous suspension of curdlan at a temperature not lower than 85° C. during and/or after passage through a small-diameter tubing with a sectional area of 0.1 to 30 mm$^2$ at a discharge rate not exceeding 500 cm/sec.

The "curdlan" is a general name of thermo-gelable $\beta$-1,3-glucan type polysaccharides, and the species elaborated by microorganisms of the Alcaliqenes or of the Agrobacterium can for example be employed. Specifically, there can be employed the thermo-gelable polysaccharide produced by *Alcaliqenes faecalis var. myxogenes* 10C3K (Agricultural Biological chemistry, Vol. 30, page 196, 1966), the thermo-gelable polysaccharide produced by NTK-$\mu$(IFO 13140), a mutant strain of said *Alcaliqenes faecalis var. myxogenes* 10C3K (Japanese Patent Publication No. 32673/1973), the thermo-gelable polysaccharide produced by *Agrobacterium radiobacter* (IFO 13127) and that produced by its mutant strain $\mu$-19 (IFO 13126).

In suspending curdlan in water, the concentration is generally about 1 to 10 percent (w/v) and preferably about 2 to 7% (w/v). While curdlan may be simply dispersed in water, pretreatment such as mechanical homogenization followed by degassing often results in homogenous gelation in the heating stage to give gels of improved quality. This aqueous suspension may be prepared using curdlan alone but gels having optional flavors and appearances can be produced by adding various subsidiary materials in preparation of the aqueous suspension. For example, flavored or seasoned gels can be obtained by incorporating appropriate amounts of sucrose, table salt, soy sauce, condiments and so on.

Similarly, various extracts such as seaweed extract, fish extract, meat extract, etc., flavors such as citron flavor, mushroom flavor, etc., proteinous materials such as egg yolk, egg white, soybean protein, soya milk, etc., oleaginous materials such as butter, margarine, salad oil, etc., and/or fruit and vegetable pastes can also be incorporated. These auxiliary materials can be added in suitable amounts not detrimental to the thermal gelation of curdlan.

The aqueous suspension of curdlan is heated to gel at a temperature not lower than 85° C. during and/or after passage through a small-diameter tubing with a sectional area of 0.1 to 30 mm² at a discharge rate not exceeding 500 cm/sec. The feed aqueous suspension may be supplied at room temperature or preheated to a temperature up to about 70° C., preferably in the range of about 55° to 70° C.

The following two alternative modes of heating for gelation can be optionally selected: a process in which an aqueous suspension of curdlan is fed into a small-diameter tube preheated at a temperature not lower than 85° C. (hereinafter referred to as Process A) and a process in which an aqueous suspension of curdlan is passed through a small-diameter tubing and, then, heated (Process B). The production of linear curdlan gels in Process A can for example be carried out in accordance with the flow chart shown in FIG. 1.

As aqueous suspension of curdlan of proper concentration is prepared in a storage tank 1. As aforementioned, subsidiary raw materials suited to the intended use are added at this stage. To avoid a local variation in concentration, this suspension is preferably kept stirred by means of a stirrer 2 during operation of the process handware. This suspension is usually passed through a homogenizer 3 for improved blending between curdlan and water. The homogenizer may be of the stirring type, mill type or pressure type, for instance. The suspension is thereafter generally subjected to degassing treatment but this treatment may be omitted when the homogenizer used is of the type which does not cause incorporation of any appreciable amount of air in the suspension. The homogenized aqueous suspension of curdlan is fed by a constant-rate pump to a gelation tubing 5, in which it is heated to a temperature not less than 85° C.

This heating can be accomplished by admitting steam from an outlet 5 to heat the small-diameter tubing and withdrawing it from an outlet 7, although other heating schemes such as the use of a water bath or an oil bath or electric heating can also be employed. While the heating temperature should not be lower than 85° C. as mentioned hereinbefore, it is preferably not lower than 90° C. and may range up to about 120° C. Generally speaking, however, a temperature up to 100° C. is sufficient.

Only one gelation tubing 5 is shown in FIG. 1 but for commercial-scale production, a plurality of tubes is preferably employed for efficiency's sake. While the cross-sectional area of the tubing has already been defined hereinbefore, it is preferable that the maximum linear dimension of the section (for example, the diameter when the sectional configuration is circular or the length of the diagonal line in the case of a square section) should be 0.4 to 10 mm. The sectional geometry of the tubing is optional and may for example be round, oblong, rectangular or triangular. The heated segment of the tubing may be longer than about 50 mm and there is no upper limit but it would be obviously meaningless to use tubes longer than 600 mm for purposes of causing gelation of curdlan. The material of the tubing is also virtually optional, only if it is heat-resistant and presents no problem in food hygienics, and may thus be stainless steel, hard glass, synthetic resin or the like.

In Process B, another heating mode, an aqueous suspension of curdlan is passed through a small-diameter tubing with a sectional area of 0.1 to 30 mm² and discharged into a hot water bath at a temperature not lower than 85° C. for gelation. In this process, the discharge end of the small-diameter tubing is generally disposed at a distance not greater than about 200 mm, preferably about 1 to 50 mm, from the liquid level of the water bath but, if desired, may be submerged in the bath to a limited extent. Process B does not require a lengthy tube which is essential to process A but all that is required is that the tip portion of the tube from which the aqueous suspension of curdlan is discharged have a small-diameter geometry with a cross-sectional area of 0.1 to 30 mm². The required length of the portion of the tube through which the curdlan suspension is discharged may generally be at least about 0.5 mm and preferably be about 0.5 to 15 mm. In this specification, the tube having such a tip geometry is also included in the definition of small-diameter tubing.

Figure 2:
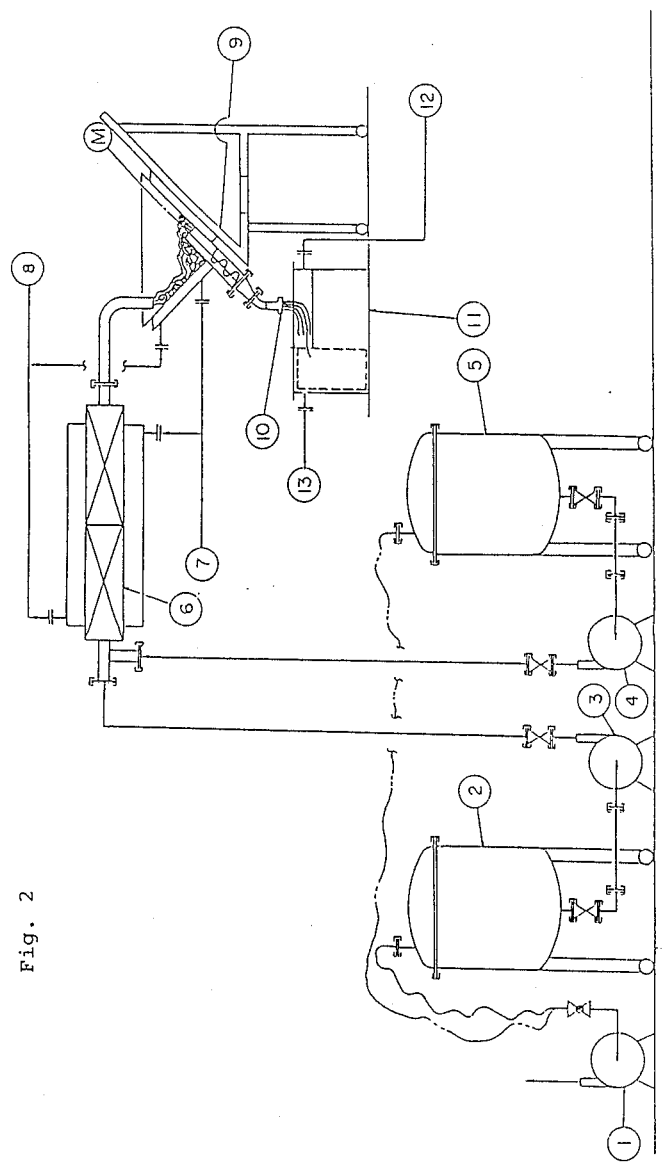
FIG. 2 shows an embodiment in which an aqueous suspension of curdlan is discharged from a small-diameter tubing and, then, heated. In the view, 1 represents a vacuum pump, 2 and auxiliary material tank, 3 and 4 each a constant-rate pump, 5 an aqueous curdlan suspension tank, 6 a mixer-heater, 7 a preheating water inlet, 8 a preheating water outlet, 9 a snake pump, 10 nozzles, 11 a hot water bath, 12 a hot water inlet and 13 a hot water outlet.

The specific equipment may for example comprise a multiplicity of such small-diameter tubes connected to the delivery ports of a snake pump and a hot water bath into which the aqueous suspension of curdlan is extruded from said small-diameter tubes. By means of this equipment, the desired gelation can be achieved with efficiency. The flow diagram for the production of linear curdlan gels by Process B is shown in FIG. 2.

The discharge speed of the curdlan gels or the curdlan suspension at the discharge end of the small-diameter tubing in the practice of the present invention is controlled at a maximum of 500 cm/sec. If the discharge rate is increased beyond 500 cm/sec., the thermal gelation will not be sufficient. On the other hand, retarding the discharge of gels will not affect the gelation so much and it may be possible, if necessary, to use an intermittent discharge scheme. In the case of Process A, where the aqueous curdlan suspension is not preheated but fed at room temperature, very satisfactory gels can generally be obtained at a discharge rate of 1 to 5 cm/sec. The discharge rate may be increased by preheating the aqueous suspension of curdlan at a temperature of about 55° to 70° C.

In the case of Process B, the discharge rate can be increased up to 500 cm/sec. and linear curdlan gels of excellent quality can be obtained particularly in the range of 1 to 300 cm/sec, more preferably 10 to 300 cm/sec. In Process B, when the curdlan concentration is as low as about 3% or less, it is advantageous, in terms of processability and product quality, to preheat the curdlan suspension at the above-mentioned temperature.

By the procedure described above, linear gels of the shape complementary to the inner geometry of the tubing can be continuously produced. The gels may be discharged into water or alternatively into air and be taken up directly or cut to length before being taken up.

The linear curdlan gels obtainable by the method of this invention can be utilized as jelly-like foods, similar to conjak noodles, "mozuku", gelidium jelly noodles, etc., thanks to the aforementioned geometric feature and incorporation of various subsidiary materials. The curdlan gels do not collapse upon reheating and are therefore compatible with various cooking methods.

For use as preserved foods, the gels are amenable to post-packaging heat sterilization and retort cooking because they are sparingly degraded by heat. Furthermore, the gels are stable against pH change, can be preserved in acidic seasoning liquors, or can even be salted or frozen for storage.

The following examples are further illustrative of the present invention. In these examples, the curdlan produced by the mutant strain NTK-u (IFO 13140) of *Alcaligenes faecalis* var. myxoqenes 10C3K was used.

EXAMPLE 1

Seaweed was put in water and extracted by heating. To 1 kg of the resulting extract was added 50 g of curdlan (spray-dried powder). The mixture was fed to a mixer to prepare a homogenous suspension, followed by vacuum degassing. On the other hand, a stainless steel tube with an inner diameter of 1 mm and a total length of 40 cm was set in a boiling water bath in such a manner that the inlet and outlet ends of the tube were emergent from the water bath. The immersed length of the stainless steel tube was 30 cm. From the inlet end of the tube, the above aqueous suspension of curdlan was introduced into the tube by means of a microtubular pump at a discharge rate of 4 mm/sec. By the above procedure, linear curdlan gels containing seaweed extract were continuously obtained at the outlet end of the stainless steel tube. The linear gels were cut in a length of about 20 cm. The thus obtained "mozuku"-like gels had a seaweed flavor and a good palatability or mouthfeel.

EXAMPLE 2

One Kg of a 7% (w/v) aqueous suspension of curdlan was blended with 50 g of light-colored soy, 30 g of sucrose and 10 g of beef extract and the mixture was degassed to give a stock liquor. On the other hand, a stainless steel tube with an inner diameter of 2 mm and a total length of 80 cm was set in an oil bath at 95° C. in such a manner that the immersed length of the stainless steel tube was 70 cm. From the inlet end of the tube the above aqueous suspension of curdlan was fed by a constant-rate pump at a discharge rate of 2 mm/sec., whereby linear curdlan gels containing seasonings were continuously extruded from the outlet end of the tube. The linear gels were cut in a length of about 30 cm. The gels simulating conjak noodles had a "sukiyaki"-like taste and were excellent in flavor and palatability.

EXAMPLE 3

A multitubular heat exchanger comprising a drum having an open space 10 cm in diameter and 1 m in length and, as disposed therein, 10 parallel tubes with an inner diameter of 3 mm, with open ends, was provided. The tubes were heated by feeding steam into the drum space of the heat exchanger. On the other hand, a constant-rate pump was set at the ends of the tubes and a 3% (w/v) aqueous suspension of curdlan was fed into the tubes at a discharge speed of 2 mm/sec. By the above procedure, linear curdlan gels were continuously obtained at the outlet ends of the tubes. The linear gels were cut in a length of about 25 cm to give gels simulating gelidium jelly noodles.

EXAMPLE 4

Raw soybean (6.5 kg) was washed thoroughly with water and soaked in water overnight. The soaked soybean was milled with water in a grinding mill to give 42 kg of a soybean homogenate. Following addition of 30 g of a soybean curd improving agent [Emulsuy® A, glycerin fatty acid ester (highly purified distilled monoglyceride) distributed by Takeda Chemical Industries, Ltd.), the above soybean homogenate was steamed until the internal temperature of 105° C. was attained. Then, using a squeezing machine, it was separated into a cake and a soya milk (solid content: 10.2 w/w %). Using the equipment illustrated in FIG. 2 and the soya milk obtained above, soya milk-containing curdlan gel noodles were manufactured by the following process.

First, about 30 kg of soya milk was fed to a storage tank 2. On the other hand, 120 g of a soybean curding agent (Tatsujin® No. 5, Riken Vitamin Co., Ltd.) composed of glucono-6-lactone 64%, magnesium chloride 20%, citric acid 14% and other ingredients 2% was dissolved in 1.7 kg of water and the solution was mixed with a curdlan homogenate prepared by milling 1.2 kg of curdlan with 17 kg of water in a cutter-mixer (Stephan Co., Model UMM-24). The mixture was fed to a storage tank 5 in which it was degassed by means of a vacuum pump 1. The liquor in storage tank 2 and the liquor in storage tank 5 were simultaneously fed to a mixer-heater 6 by means of a pump 3 (18 l/hr) and a pump 4 (12 l/hr), respectively. In the mixer-heater 6, the mixture was blended under heating at 60° C. to give a viscous slurry. This slurry was fed to a snake pump 9 equipped with nozzles 10 (ten nozzles, 1 mm in diameter and 10 mm in length each) which was positioned in such a manner that the tips of the nozzles were apart by 10 mm from the liquid level of a hot water bath 11. The slurry was extruded into the hot water at 90° C. in the bath 11 at a rate of about 30l/hr (the discharge rate at the nozzle tip =106 cm/sec) to give continuously soya milk-containing curdlan gel noodles. After cutting in a length of about 20 cm, this product could be served cold together with a seasoning liquor or hot as added to a "miso" soup, invariably offering good palatability.

EXAMPLE 5

Raw soybean, 7 kg, was washed thoroughly with water and soaked in water overnight. The soaked soybean was homogenized with water in a grinding mill to give 42 kg of a soybean homogenate. To this homogenate was added 50 g of Emulsuy A for Soybean Curd (Takeda Chemical Industries, Ltd.) and the mixture was steamed at an internal temperature of 90° C. for 4 minutes. The mixture was then mechanically squeezed to separate a soya milk (solids content 11.2 w/w %) from the cake.

One-hundred grams of a soya milk prepared in the same manner as above and 100 g of 7 w/w % curdlan paste were taken in a 200 ml beaker, degassed and, then, held on a water bath at 65° C. The mixture was taken into a cream squeezer fitted with a nozzle having a discharge orifice (2 mm in diameter and 5 mm in length) and extruded into a water bath at 90° C. from the nozzle end positioned by 3 mm apart from the liquid level at about 30 cm/sec of discharge rate to give continuously linear curdlan gels containing a soya milk. The gels were cut in a length of 25 cm having the shape of "somen" noodles (thready "tofu"). This food could be served cold together with a seasoning liquor or hot as incorporated in a "miso" soup or the like.

What we claim is:

1. A method of producing linear curdlan gels, which comprises heating to gel an aqueous suspension of curdlan at a temperature not lower than 85° C. during or after passage through a small-diameter tubing with a sectional area of 0.1 to 30 mm² at a discharge rate not exceeding 500 cm/sec.

2. The method according to claim 1, wherein the aqueous suspension of curdlan is heated for gelation during passage through the small-diameter tubing with the heated segment longer than about 50 mm.

3. The method according to claim 1, wherein the aqueous suspension of curdlan, after passage through the small-diameter tubing, is discharged into hot water at a temperature not lower than 85° C. for gelation.

4. The method according to claim 1, wherein the aqueous suspension of curdlan is about 1 to 10 percent (weight/volume).

5. The method according to claim 1, wherein the heating temperature is 85° to 100° C.

6. The method according to claim 1, wherein the discharge rate is 1 to 300 cm/sec.

7. The method according to claim 3, wherein the discharge rate is 10 to 300 cm/sec.

* * * * *